US008730831B2

(12) United States Patent
Wang et al.

(10) Patent No.: US 8,730,831 B2
(45) Date of Patent: May 20, 2014

(54) METHOD AND SYSTEM FOR ACQUIRING ROUTE STRATEGIES

(75) Inventors: Jing Wang, Shenzhen (CN); Yuzhen Huo, Shenzhen (CN); Na Zhou, Shenzhen (CN); Zaifeng Zong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 128 days.

(21) Appl. No.: 13/393,336

(22) PCT Filed: Aug. 13, 2010

(86) PCT No.: PCT/CN2010/076004
§ 371 (c)(1),
(2), (4) Date: Feb. 29, 2012

(87) PCT Pub. No.: WO2011/026392
PCT Pub. Date: Mar. 10, 2011

(65) Prior Publication Data
US 2012/0163300 A1    Jun. 28, 2012

(30) Foreign Application Priority Data
Sep. 3, 2009   (CN) .......................... 2009 1 0091983

(51) Int. Cl.
*H04L 12/26*    (2006.01)
(52) U.S. Cl.
USPC ........................... 370/252; 370/254; 370/328
(58) Field of Classification Search
None
See application file for complete search history.

(56) References Cited

U.S. PATENT DOCUMENTS

| 2002/0191573 A1* | 12/2002 | Whitehill et al. ............. 370/338 |
| 2005/0237968 A1* | 10/2005 | Womack et al. ............. 370/328 |
| 2007/0217377 A1* | 9/2007 | Takeuchi ..................... 370/338 |
| 2008/0144497 A1* | 6/2008 | Ramprashad et al. ..... 370/230.1 |
| 2008/0274736 A1* | 11/2008 | Hu ................................ 455/433 |

FOREIGN PATENT DOCUMENTS

| CN | 1798364 A | 7/2006 |
| CN | 1859412 A | 11/2006 |
| WO | WO 2007028717 A1 * | 3/2007 | .............. H04Q 7/38 |
| WO | WO-2008/082331 A1 | 7/2008 |
| WO | WO 2008082331 A1 * | 7/2008 | .............. H04L 12/28 |

OTHER PUBLICATIONS

International Search Report (in Chinese with English translation) for PCT/CN2010/076004, mailed Nov. 18, 2010; ISA/CN.

* cited by examiner

*Primary Examiner* — Ian N Moore
*Assistant Examiner* — Eric P Smith
(74) *Attorney, Agent, or Firm* — Harness, Dickey & Pierce, PLC

(57) ABSTRACT

A routing strategy provision unit sends routing strategies of local IP access to radio side network elements; the radio side network elements receive the routing strategies of local IP access. The radio side network elements are able to acquire the routing strategies of local IP access at the network element level or the user level, so that the radio side network elements transmit data according to the routing strategies, and the radio side network elements can effectively offload the data with the acquired routing strategies. Besides, the routing strategies might be for users, that is, different routing strategies might be made for different users, thereby improving the user experience and promoting generalization and popularization of services.

13 Claims, 8 Drawing Sheets

METHOD AND SYSTEM FOR ACQUIRING ROUTE STRATEGIES

CROSS-REFERENCE TO RELATED APPLICATIONS

This application is a 371 U.S. National Stage of International Application No. PCT/CN2010/076004, filed Aug. 13, 2010, and claims priority to Chinese patent application No. 200910091983.3, filed Sep. 3, 2009, the disclosures of which are herein incorporated by reference in their entirety.

TECHNICAL FIELD

The present invention relates to mobile communication technologies, and more particularly, to a method and a system for acquiring a routing strategy.

BACKGROUND OF THE RELATED ART

In order to maintain the competitiveness of the third generation mobile communication system in the field of communication, to provide mobile communication services with faster speed, lower delay and more personalization for users, and meanwhile to reduce the operator's operating costs, the third Generation Partnership Project (3GPP) standard working group is committing to the research of the Evolved Packet System (EPS). FIG. 1 is a schematic diagram of structure of the EPS, and as shown in FIG. 1, the whole EPS is divided into two parts: the radio access network and the core network. The core network comprises Home Subscriber Server (HSS) 101, Mobility Management Entity (MME) 102, Serving General Packet Radio Service (GPRS) Support Node (SGSN) 103, Policy and Charging Rule Function (PCRF) 104, Serving Gateway (S-GW) 105, PDN Gateway (P-GW) 106 and Packet Data Network (PDN) 107. The functions of each part are as follows.

The HSS 101 is the permanent storage site of user subscription data and is located in the user subscribed home network.

The MME 102 is the storage site of the user subscription data in the current located network and is responsible for the non-access stratum signaling management from the user equipment to the network, the security verification function of the user equipment, the mobility management of the user equipment, tracking and paging management function in the idle mode of the user equipment as well as bearer management.

The SGSN 103 is the serving support node for the user equipment accessing the core network in the GSM EDGE Radio Access Network (GERAN) and the Universal Terrestrial Radio Access Network (UTRAN), and its function is similar to the MME 102 and is responsible for functions of location update, paging management, and bearer management etc. of the user equipment.

The S-GW 105 is the gateway from the core network to the ratio access network and is responsible for functions of the user plane bearer from the user equipment to the core network, data cache in the idle mode of the user equipment, the network side initiating a service request, and functions of legal interception, packet data routing and forwarding; and it is responsible for performing statistic of the situation of the user equipment using the radio access network, generating the bill of the user equipment using the radio access network, and transmitting the bill to the charging gateway.

The P-GW 106 is the gateway for the EPS interacting with the external PDN 107 of the EPS, it is respectively connected to the Internet and the PDN 107, and is responsible for functions of the user equipment's Internet Protocol (IP) address allocation, charging function, packet filtering, and strategy control, and so on.

The PDN 107 is the operator's IP service network, and it provides IP service to the user equipments via the operator's core network.

The PCRF 104 is the server responsible for providing rules of charging control, online credit control, threshold control, and quality of service (QoS) strategies and so on in the EPS.

The radio access network is composed of the E-UTRAN NodeB (eNB) 111 and the third-generation (3G) Radio Network Controller (RNC) 112, and it is mainly responsible for sending and receiving radio signals, interacting with the user equipment via the air interface, managing the radio resource, resource scheduling and access control of the air interface and so on.

The above SGSN 103 is an upgraded SGSN, and it can support the S4 interface with the S-GW 105 and interconnects with MME 102 using the GPRS Tunneling Protocol (GTP) v2. However, for the SGSN 103 supporting the 3G core network, the PS domain network architecture is different from that in FIG. 1, and at this point, the SGSN 103 and the MME 102 connect via the Gn interface and interconnect using the GTPv1; the SGSN 103 cannot connect with the S-GW 105 and directly accesses the PDN 107 by connecting the Gateway GPRS Support Node (GGSN) via the Gn interface.

The Home NodeB (HNB) or the Home eNodeB (HeNB) is a class of miniature and low-power NodeBs, acts as the dedicated resources of certain users, is deployed in private places such as homes, groups, companies or schools for use, and is mainly for providing higher service speed for users and reducing the cost needed in using the high-speed services and meanwhile making up the lack of the coverage of the existing distributed cellular radio communication systems. The HNB has the advantages of affordable, convenient, low-power output, plug and play, broadband access, and using single-mode terminals, and so on.

The Home NodeB can be applied in the 3G or Long Term Evolution (LTE) mobile communication network. In order to facilitate the management of the home NodeB, a new network element, namely the HNB gateway, is introduced into the mobile communication network. The main functions performed by the HNB gateway are: verifying the security of the Home NodeB, maintaining and managing the operation of the HNB, configuring and controlling the HNB according to the operator's requirements, and exchanging data information between the core network and the HNB.

FIG. 2 is a schematic diagram of the network architecture of the 3G HNB, as shown in FIG. 2, the 3G home NodeB (HNB) 201 connects to the HNB gateway (HNB GW) 202 via the newly defined luh interface, and the HNB GW 202 provides the luPS interface to the packet domain and the luCS interface to the circuit domain in the core network. For the 3G mobile communication network, the HNB GW 202 is a required deployment to shield the effects to the user equipment and network side after introducing the HNB 201.

For the LTE mobile communication network, the HeNB GW is an optional deployment, and therefore, there are two methods for connecting the LTE HeNB and the core network; one is that the HeNB 301 directly connects with network elements in the core network, as shown in FIG. 3; the other is that the HeNB 401 connects with network elements in the core network via the HeNB GW 402, as shown in FIG. 4A. For the scenario of introducing the HNB gateway as shown in FIG. 4A, the HeNB gateway might not integrate the user plane functions, and the user plane is established directly between the HeNB gateway and the user plane gateway of the core network, which enable to flatten the user plane and decrease the data transmission delay, and its structure is shown as FIG. 4B.

Besides supporting to access the core network, the HNB might also support the local IP access (LIPA) function, under the condition that the HNB has the local IP access capability and the user subscription allows the local IP access, the local access of the user to other IP devices in the home network or the Internet can be implemented, and the other IP devices are devices except the user equipment in the home network. With the local IP access function, the Internet data service offload can be implemented, so as to reduce the load of the core network, and the access to the devices in the home network can be forwarded without passing the core network, and the data transmission is convenient and efficient.

The local IP access function might also be applied in the macro cell or the HNB GW, its main purpose is similar to the HNB, and it is applied more in such a scenario that the local IP accesses Internet, so as to reduce the load of the core network.

FIG. 5 is a schematic diagram of a method for implementing the local IP access function, as shown in FIG. 5, the data sent by the user equipment 501 to the home network 502, the Internet 503 and the core network 504 can share the same PDN connection, the data offload function unit in the radio side network elements 505 can fulfill the selection of the data packet routing, the Network Address Translation (NAT) function unit 506 translates the user internal address to the outside. The data offload function unit and the NAT function unit 506 might be deployed with the NodeB (such as HNB, and macro NodeB) together or the HNB gateway, or might be deployed separately.

Currently, there is no definite solution of the method for acquiring the routing strategies applied by the data offload function unit in the radio side network elements.

SUMMARY

In view of this, the main object of the present document is to provide a method and a system for acquiring a routing strategy so that radio side network elements can acquire routing strategies of the local IP access.

To achieve the above object, the technical scheme of the present document is implemented as follows.

A method for acquiring a routing strategy comprises:
a routing strategy provision unit sending a routing strategy of local IP access to a radio side network element; and
the radio side network element receiving the routing strategy of the local IP access.

The routing strategy is a routing strategy for the network element, and the routing strategy provision unit is a radio side network element management system,
the routing strategy provision unit sends the routing strategy of the local IP access to a radio side network element comprises: when the radio side network element powers on or the routing strategy changes, the radio side network element management system sending the routing strategy of the local IP access to the radio side network elements.

The routing strategy provision unit is a mobility management element,
the routing strategy is a routing strategy for a network element, the process of the routing strategy provision unit sending the routing strategy of the local IP access to the radio side network elements comprises: the mobility management element locally configuring a general routing strategy of the local IP access to send to the radio side network element;

the routing strategy is a routing strategy for a user, and before the routing strategy provision unit sending the routing strategies of the local IP access to the radio side network elements, the method further comprises: when a user equipment registers to the network or a location of the user equipment changes, or the routing strategy changes, a Home Subscriber Server (HSS) sending the routing strategy of the local IP access to the mobility management element.

The routing strategy provision unit is a mobility management element,
the routing strategy provision unit sending the routing strategy to the radio side network element comprises: a new mobility management element sending the routing strategy of the local IP access from an original mobile management element to the radio side network element.

The routing strategy provision unit is any other radio side network elements except said radio side network element,
the routing strategy provision unit sending the routing strategy to the radio side network element comprises: a source radio side network element sending the routing strategy of the local access to the radio side network element.

The routing strategy is: a routing strategy for a network element, or a routing strategy for a user.

A system for acquiring a routing strategy comprises:
a routing strategy provision unit, which is used to send a routing strategy of local IP access to a radio side network element; and
the radio side network element, which is used to receive the routing strategy of the local IP access.

The routing strategy provision unit is: a radio side network element management system, or a mobility management element, or another radio side network element; and/or,
the radio side network element is: a home NodeB, or a macro NodeB, or a HNB gateway or a data offload function unit; and/or,
the routing strategy is: a routing strategy for a radio side network element, or a routing strategy for a user.

The mobility management element is: a Serving General Packet Radio Service Support Node (SGSN), or a mobility management entity (MME).

The routing strategy provision unit is a mobility management element, the routing strategy is the routing strategy for a user, and the system further comprises a HSS which is used to provide the routing strategy of the local IP access for the mobility management element.

The data offload function unit might be deployed with the HNB, the macro NodeB, or the HNB gateway, or might be deployed separately.

A range of the local IP access is: the local access of the user to all IP devices except a user equipment in the home network or the Internet.

The present document provides a solution for radio side network elements acquiring routing strategies. With the solution of the present document, the radio side network elements might acquire the routing strategies of the local IP access of the network element level or the user level, thus the network element at the radio side is enabled to transmit the data according to the routing strategies, so that the radio side network elements can effectively offload the data based on the acquired routing strategies.

In addition, in the solution of the present document, the routing strategies might be for the users, that is, different routing strategies might be made for different users, which will certainly improve the user experience and can contribute to the generalization and popularization of services.

DETAILED DESCRIPTION

Figure 1:
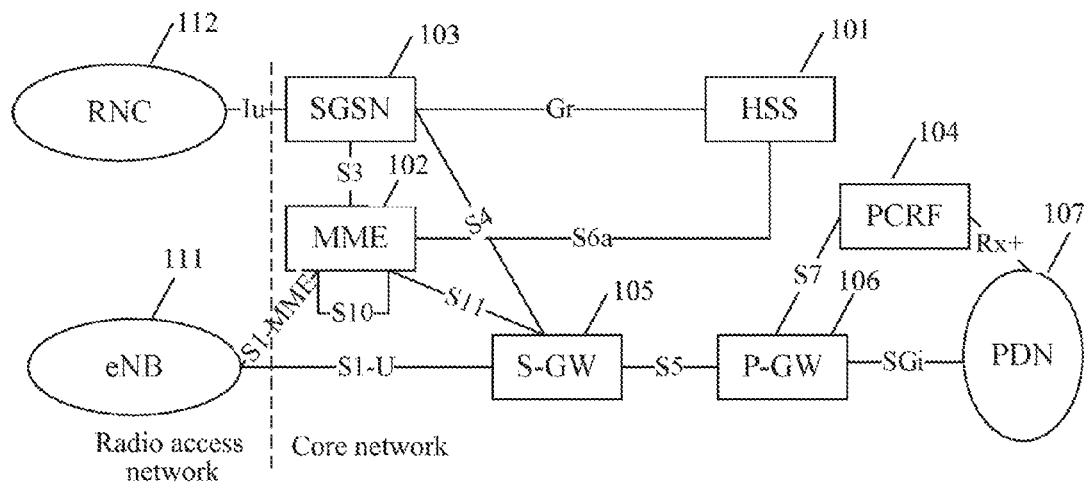
FIG. 1 is a schematic diagram of the structure of the EPS.
Figure 2:
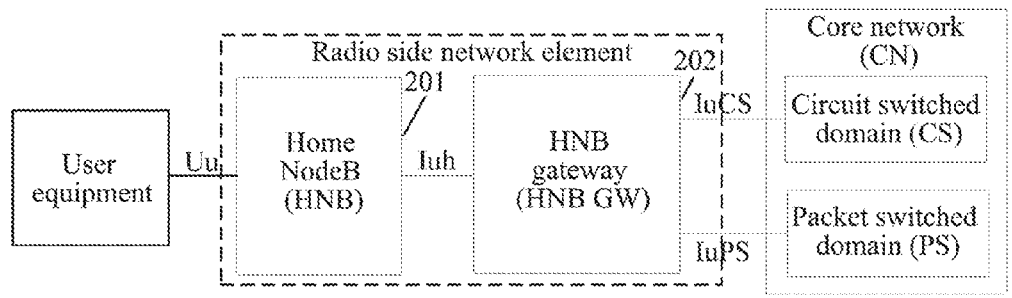
FIG. 2 is a schematic diagram of the network architecture of a 3G HNB.
Figure 3:
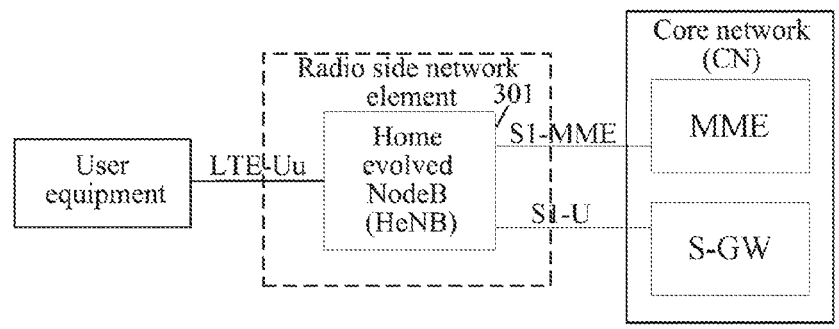
FIG. 3 is the schematic diagram 1 of the network architecture of a LTE HNB.
Figure 4A:
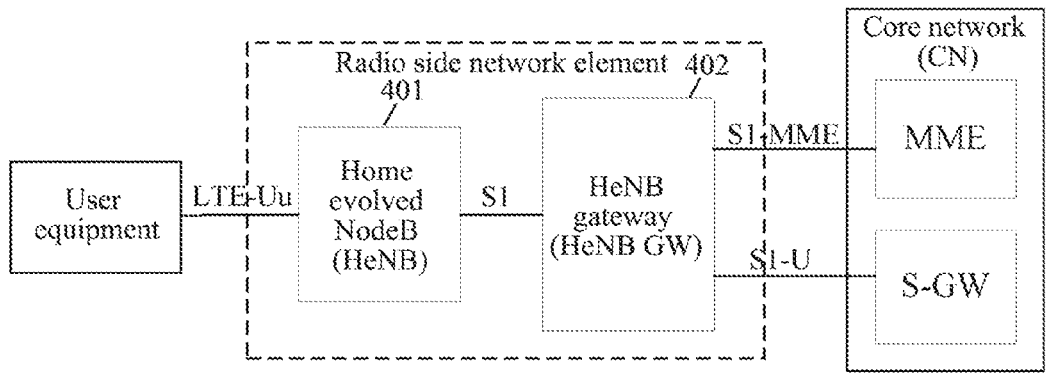
FIG. 4A is the schematic diagram 2 of the network architecture of a LTE HNB.
Figure 4B:
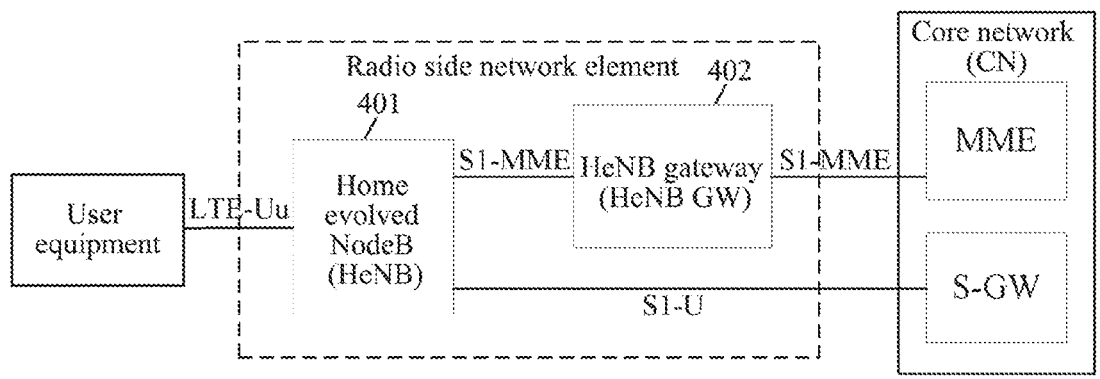
FIG. 4B is the schematic diagram 3 of the network architecture of a LTE HNB.
Figure 5:
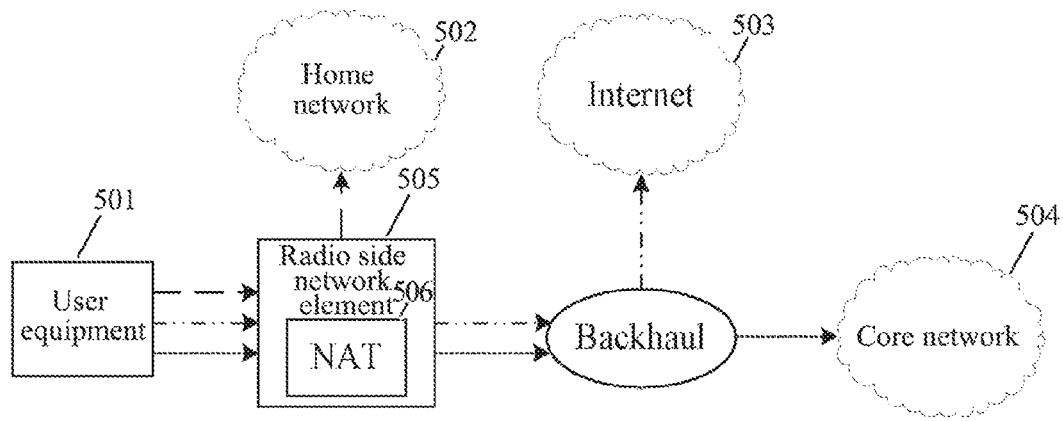
FIG. 5 is the schematic diagram of a method for implementing the local IP access function.

In the present document, the routing strategy provision unit sends routing strategies of the local IP access to the radio side network elements; the radio side network elements receive the routing strategies of the local IP access. The radio side network element might be a home NodeB, a macro NodeB, a HNB gateway, or a data offload function unit. The data offload function unit might be deployed with the home NodeB, the macro NodeB, or the HNB gateway, or might be deployed separately. The routing strategy provision unit might be a radio side network element management system, a mobility management element, or other radio side network elements; wherein the mobility management element might be the SGSN or the MME. The routing strategies comprise but are not limited to the corresponding relationship between the routing options and the destination address to which the data is transmitted; the routing strategies might be routing strategies of the network element level, that is, routing strategies for the radio side network elements, or might be routing strategies of the user level, namely the routing strategies for the users. The routing strategy provision unit might send the routing strategies to the radio side network elements when the radio side network elements execute a process related to the local IP access function; or might send the corresponding routing strategies to the radio side network elements when the radio side network elements power on or the routing strategies are updated.

The routing strategies for the radio side network elements might be configured by the radio side network element management system, and the radio side network element management system can send the routing strategies to the radio side network elements when the radio side network elements power on; when the routing strategies change, the radio side network element management system sends the updated routing strategies to the radio side network elements. The routing strategies for the radio side network elements might also be configured by the core network, when the user's local IP access function is enabled, the mobility management element in the core network sends the routing strategies to the radio side network elements; accordingly, when the routing strategies change, the mobility management unit sends the updated routing strategies to the radio side network elements.

The routing strategies for the users might be stored in the HSS in the form of subscription data. When a user registers to the network or initiates a location update, and so on, the HSS might send the routing strategies to the mobility management element for storing; when the user's local IP access function is enabled, the mobility management element further sends the routing strategies to the radio side network elements. When the routing strategies for the users change, the HSS sends the updated routing strategies to the mobility management element, if the user equipment is in idle state, the mobility management element stores the received routing strategies, and if the user equipment is in the connection state and there is the radio bearer, the mobility management element sends the routing strategies to the radio side network elements via the S1 or Iu interface message.

In addition, when the handover of the user equipment occurs, the source radio side network element or the original mobility management element might be used to send the routing strategies to the destination radio side network element.

Figure 6:
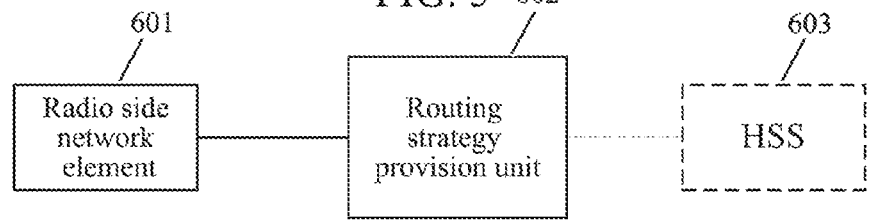
FIG. 6 is a structural diagram of a system for implementing to acquire routing strategies according to the present document.

Based on the above solution, the system for implementing to acquire the routing strategies provided in the present document comprises: the radio side network elements 601 and the routing strategy provision unit 602, as shown in FIG. 6, where the routing strategy provision unit 602 is used to send the routing strategies of the local IP access to the radio side network elements 601; the radio side network elements 601 are used to receive the routing strategies of the local IP access. The implementation of the relevant parts is identical with the above description, and is not repeated here. The routing strategy provision unit 602 is a mobility management element, the routing strategies are routing strategies for the users, and the system might further comprise the HSS 603 for providing the routing strategies of the local IP access for the mobility management element.

In the following, a plurality of specific embodiments is used to describe the specific implementation of the present document in more detail. The routing strategies in each of the following specific embodiments all refer to the routing strategies of the local IP access.

Figure 7:
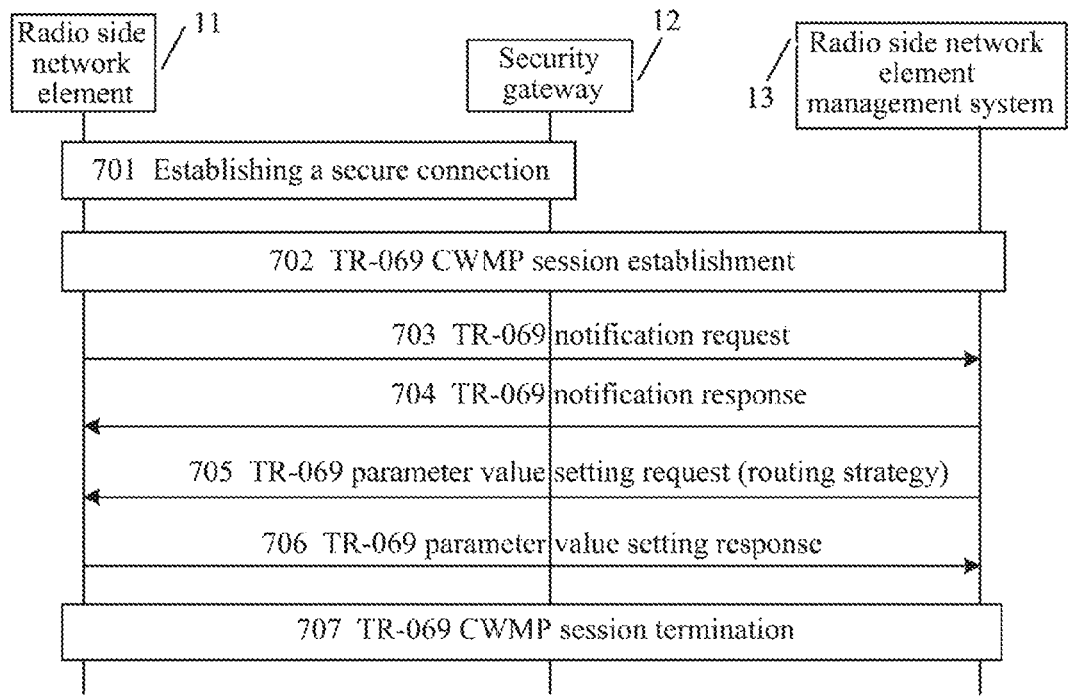
FIG. 7 is a flow chart of the radio side network element management system configuring routing strategies according to the present document.

FIG. 7 is a schematic diagram of the procedure of the radio side network element management system configuring the routing strategies according to the present document, and as shown in FIG. 7, the procedure specifically comprises the following steps.

Step 701: the radio side network element 11, such as the home NodeB, macro NodeB, HNB gateway or data offload function unit powers on, and then establishes a secure IP layer security protocol (IPSec) tunnel with the security gateway 12. The data offload function unit might be deployed with the HNB, the macro NodeB, or the HNB gateway, or might be deployed separately.

Step 702: The radio side network element 11 queries to get the address of the radio side network element management system 13 via the domain name server (DNS), and establishes a TR-069 customer premise equipment (CPE) Wide Area Network Management Protocol (TR-069 CWMP) session with the radio side network element management system 13 based on this address.

Step 703: the radio side network element 11 uses the TR-069 notification request message to report the location parameter and the radio side network element identifier to the radio side network element management system 13 after completing to establish the session.

Step 704: the radio side network element management system 13 receives the TR-069 notification request message, and then returns a TR-069 notification response message to the radio side network element 11 to notify the radio side network element 11 to accept the information of the radio side network element 11.

Step 705: the radio side network element management system 13 uses the TR-069 parameter setting request message to send the radio side network element parameter information including the radio configuration parameter, the S-GW address, and the routing strategies, and so on to the radio side network element 11, and the radio side network element parameter information; wherein the routing strategies are for the radio side network elements and might be the corresponding relationship between the packet destination address and the two routing options of the local IP access or the core network access; also might be a relationship between the local IP access type and the routing options, wherein the Local IP access type is the local IP access to Internet, or the local IP access to home network, and so on.

The routing strategies for the radio side network elements might be set by the administrator and stored in the radio side network element management system 13, and also might be set by the radio side network element management system 13 according to the setting rules.

Step 706: the radio side network element 11 receives the TR-069 parameter value setting request message, and then updates the parameter configuration, and then returns the TR-069 parameter value setting response message to the radio side network element management system 13.

Step 707: the radio side network element 11 initiates to terminate the TR-069 CWMP session with the radio side network element management system 13, and releases the corresponding session connection.

When the routing strategies for the radio side network elements change, the updated routing strategies can be sent to the radio side network element 11 by the radio side network element management system 13 directly by step 705, so that the radio side network element 11 can update the routing strategies.

Figure 8:
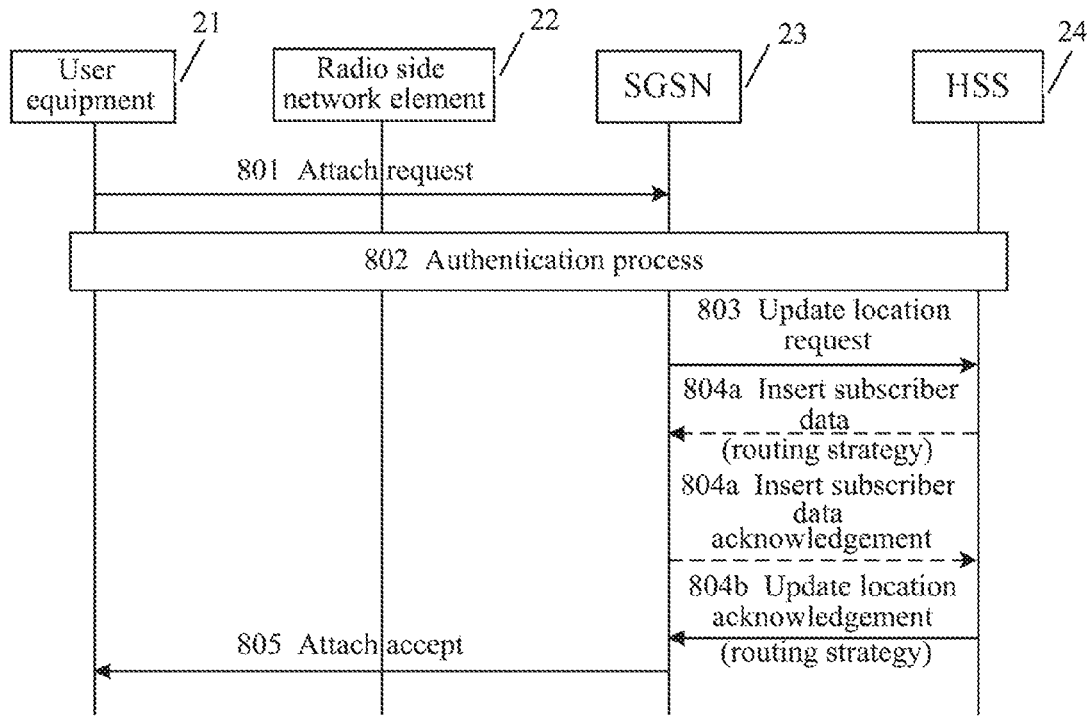
FIG. 8 is the schematic diagram 1 of a procedure of acquiring routing strategies when a user initiates an attachment process according to the present document.

FIG. 8 is the schematic diagram 1 of the procedure of acquiring the routing strategies when a user initiates an attachment process according to the present document, and as shown in FIG. 8, the procedure specifically comprises the following steps.

Step 801: when powering on, the user equipment 21 initiates an attachment process to register to the core network, and the user equipment 21 sends an attach request message to the SGSN 23.

Step 802: the SGSN 23 receives the attach request message, and then authenticates the user, and after the user passes the authentication, step 803 is performed; if the user does not pass the authentication, the SGSN 23 rejects the attach request message from the user equipment 21.

Step 803: the SGSN 23 determines that the SGSN 23 itself does not store the user subscription data and sends an update location request message including the information of SGSN identifier, the user identifier, and the update type and so on to the HSS 24.

After the HSS 24 receives the update location request message, if the SGSN 23 is a SGSN supporting the Gn/Gp interface, then step 804a is performed; if the SGSN 23 is a SGSN supporting the S4 interface, then step 804b is performed.

Step 804a: the HSS 24 and the SGSN 23 supporting the Gn/Gp interface use the mobile application part (MAP) protocol to interact, the HSS 24 uses the insert subscriber data process to send the user subscription data and the routing strategies to the SGSN 23, and the SGSN 23 stores the received user subscription data and the routing strategies. The SGSN 23 returns an insert subscriber data acknowledgement message to the HSS 24.

The routing strategies are for the users and might be the corresponding relationship between the packet destination address and either of the two routing options of the local IP access and the core network access; it might also be the relationship between the local IP access type and the routing option, and the local IP access type might be the local IP access to Internet, or the local IP access to home network, and so on.

Step 804b: the HSS 24 and the SGSN 23 supporting the S4 interface use the Diameter protocol to interact, the HSS 24 uses the update location acknowledgement message to send the user subscription data and the routing strategies to the SGSN 23, and the SGSN 23 stores the received user subscription data and the routing strategies.

The routing strategies are for the user and might be the corresponding relationship between the packet destination address and either of the two routing options of the local IP access and the core network access; might also be the relationship between the local IP access type and the routing option, wherein the local IP access type might be the local IP access to Internet, or the local IP access to home network, and so on.

The routing strategies stored in the HSS 24 are for each user, and might be set by the operator and stored in the HSS 24.

Step 805: the SGSN 23 sends an attach accept message including the information such as temporary identifier assigned to the user to the user equipment 21 after completing the attachment of the user.

After the SGSN 23 obtains the routing strategies for the user, if the user's local IP access function is enabled, the routing strategies for users are required, and then the corresponding routing strategies can be sent to the radio side network element 22, and the radio side network element 22 transmits the data of this user according to the routing strategies for the user.

Figure 9:
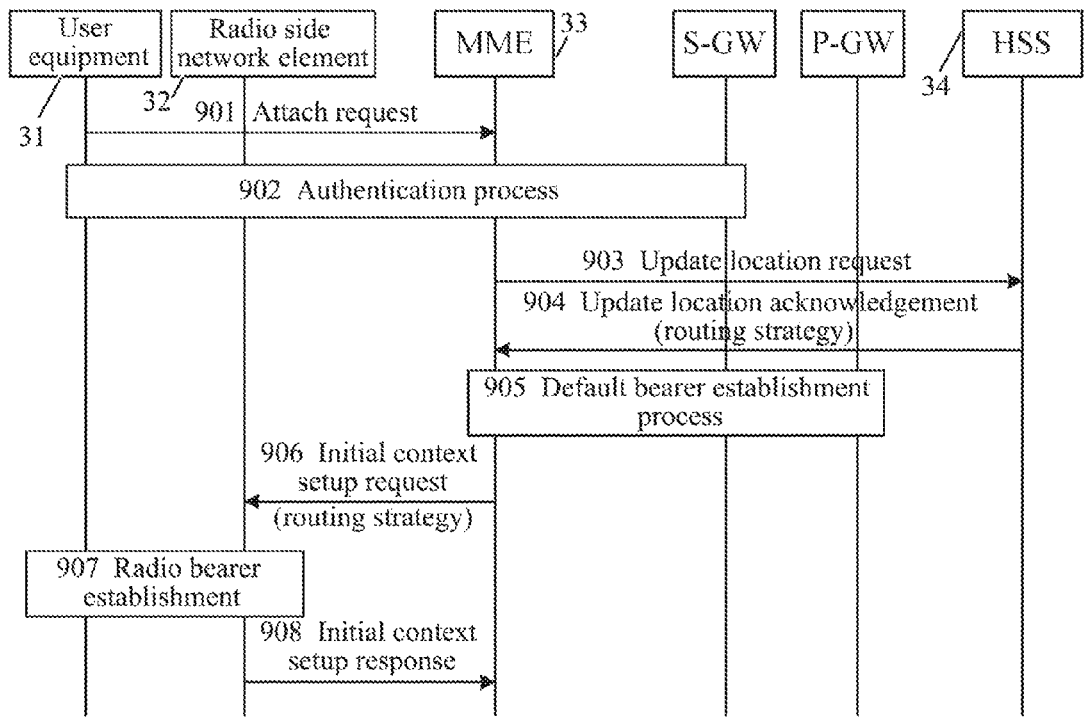
FIG. 9 is the schematic diagram 2 of a procedure of acquiring routing strategies when a user initiates an attachment process according to the present document.

FIG. 9 is a schematic diagram 2 of the procedure of acquiring the routing strategies when a user initiates an attachment process according to the present document, and as shown in FIG. 9, the procedure specifically comprises the following steps.

Step 901: when powering on, the user equipment 31 initiates an attachment process to register to the core network, and the user equipment 31 sends an attach request message to the MME 33.

Step 902: the MME 33 receives the attach request message, and then authenticates the user, and after the user passes the authentication, step 903 is performed; if the user does not pass the authentication, the MME 33 rejects the attach request message of the user equipment 31.

Step 903: the MME 33 determines that the MME 33 itself does not store the user subscription data and sends an update location request message including information of the MME identifier, the user identifier, and the update type and so on to the HSS 34.

Step 904: the HSS 34 receives the update location request message, and then uses an update location acknowledgement message to send the user subscription data and the routing strategies to the MME 33, and the MME 33 stores the received user subscription data and the routing strategies.

The routing strategies are for the user and might be the corresponding relationship between the packet destination address and either of the two routing options of the local IP access and the core network access; also might be the relationship between the local IP access type and the routing options, wherein the local IP access type might be the local IP access to Internet, or the local IP access to home network, and so on.

The routing strategies stored in the HSS 34 are for each user, and might be set by the operator and stored in the HSS 34.

Step 905: the MME 33 receives the update location acknowledgement message, and then the MME 33 establishes the default bearer at the core network side in order to support the users always online. After the default bearer at the core network side is established, the corresponding radio bearer is activated.

Step 906: if the MME 33 decides to enable the local IP access function for the user based on the user's local IP access subscription or the network load, the MME 33 uses the initial context setup request message to send the bearer-related QoS parameter and the routing strategies to the radio side network element 32, and the attach accept message can be encapsulated into the initial context setup request message which is sent to the radio side network element 32.

The specific form of the routing strategies might be the corresponding relationship between the packet destination address and two routing options of the local IP access and the core network access; it might also be the relationship between the local IP access type and the routing option, wherein the local IP access type is the local IP access to Internet, or the local IP access to home network, and so on.

The routing strategies might be for the users or for the radio side network elements. If the routing strategies are for the users, the MME 33 can send the routing strategies obtained from the HSS 34 in step 904 to the radio side network element 32; if the routing strategies are for the radio side network elements, the MME 33 can locally configure the general routing strategies of the local IP access to send to the radio side network element 32.

Step 907: the radio side network element 32 receives the initial context setup request message, and then establishes the corresponding radio bearer according to the bearer information instructed by the core network, and stores the routing strategies.

Step 908: the radio side network element 32 returns the initial context setup response message to the MME 33 after completing to establish the radio bearer to notify the core network that the radio bearer establishment is completed.

Figure 10:
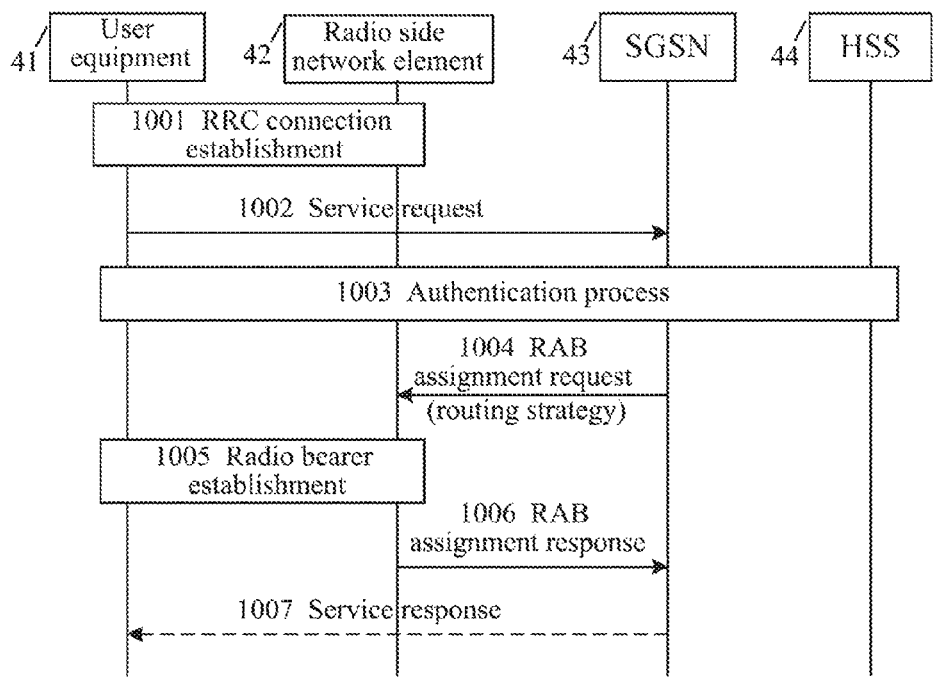
FIG. 10 is the schematic diagram 1 of a procedure of acquiring routing strategies when a user initiates a service request process according to the present document.

FIG. 10 is the schematic diagram 2 of the procedure of acquiring the routing strategies when a user initiates a service request process according to the present document, and as shown in FIG. 10, the process specifically comprises the following steps.

Step 1001: the user equipment 41 establishes the radio resource control (RRC) connection with the radio side network elements before sending a non-access stratum message.

Step 1002: if the user needs to execute the uplink service or the network side needs to execute the downlink service to page the user equipment 41, the user equipment 41 initiates a service request process and sends a service request message to the SGSN 43, and the service type contained in the service request message is signaling or data.

Step 1003: the SGSN 43 receives the service request message, and then authenticates the user, and after the user passes the authentication, step 1004 is performed; if the user does not pass the authentication, the SGSN 43 rejects the service request message from the user equipment 41.

Step 1004: if the service type contained in the service request message is data, and the core network enables the local IP access function for the user, the SGSN 43 uses the radio access bearer (RAB) assignment request message to indicate the radio side to establish the bearer, and uses the RAB assignment request message to send the bearer-related QoS parameter and the routing strategies to the radio side network elements.

The specific form of the routing strategies might be the corresponding relationship between the packet destination address and either of the two routing options of the local IP access and the core network access; it might also be the relationship between the local IP access type and the routing option, wherein the local IP access type is the local IP access to Internet, or the local IP access to home network, and so on.

The routing strategies might be for users or for the radio side network elements. If the routing strategies are for the users, the SGSN 43 can send the routing strategies obtained from the HSS 44 to the radio side network element 42 via the user registration or location update process; if the routing strategies are for the radio side network elements, the SGSN 43 can locally configure the general routing strategies of the local IP access to send to the radio side network elements.

Step 1005: the radio side network element 42 receives the RAB assignment request message, and then establishes the corresponding radio bearer according to the bearer information instructed by the core network, and stores the routing strategies.

Step 1006: the radio side network element 42 returns the RAB assignment response message after completing to establish the radio bearer to the SGSN 43 to notify the core network that the radio bearer establishment is completed.

Step 1007: if the service request process is initiated in the connection state, the SGSN 43 returns a service response message to the user equipment 41; if the service request process is initiated in the idle state, the user equipment 41 takes the safe mode control command message at the RRC layer as the reply of the service request.

Figure 11:
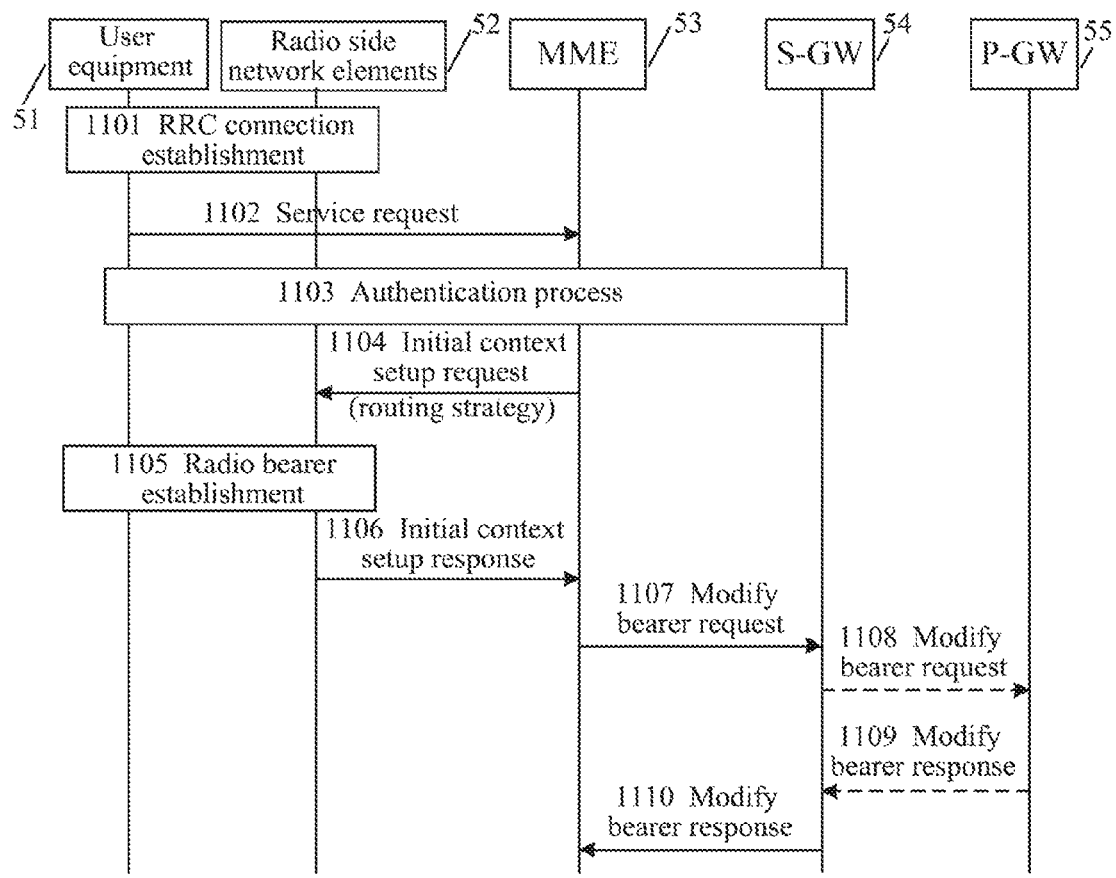
FIG. 11 is the schematic diagram 2 of a procedure of acquiring routing strategies when a user initiates a service request process according to the present document.

FIG. 11 is a schematic diagram 2 of the procedure of acquiring the routing strategies when the user initiates a service request according to the present document, and as shown in FIG. 11, the process specifically comprises the following steps.

Step 1101: the user equipment 51 establishes the RRC connection with the radio side network elements before sending the non-access stratum message.

Step 1102: if the user needs to execute the uplink service or the network side needs to execute the downlink service to page the user equipment 51, the user equipment 51 initiates a service request process to send the service request message to the MME 53.

Step 1103: the MME 53 receives the service request message, and then authenticates the user, and after the user passes the authentication, step 1104 is performed; if the user does not pass the authentication, the MME 53 rejects the service request message sent of the user equipment 51.

Step 1104: if the service request message received by the MME 53 does not distinguish the service type, then the bearers established by the core network are all re-established at the radio side. The MME 53 uses the initial context setup request message to send the bearer-related QoS parameter and the routing strategies to the radio side network elements.

The specific form of the routing strategies might be the corresponding relationship between the packet destination address and two routing options of the local IP access and the core network access; it might also be the relationship between the local IP access type and the routing option, wherein the local IP access type is the local IP access to Internet, or the local IP access to home network, and so on.

The routing strategies might be for the users or for the radio side network elements. If the routing strategies are for the users, the MME 53 can send the routing strategies obtained from the HSS to the radio side network element 52 via the user registration or the location update process; if the routing strategies are for the radio side network element 52, the MME 53 can locally configure the general routing strategies of the local IP access to send to the radio side network element 52.

Step 1105: the radio side network element 52 receives the initial context setup request message, and then establishes the corresponding radio bearer according to the bearer information instructed by the core network, and stores the routing strategies.

Step 1106: the radio side network element 52 returns an initial context setup response message to the MME 53 after completing to establish the radio bearer to notify the core network that the radio bearer establishment is completed.

Step 1107: the MME 53 receives the initial context setup response message, and then uses the modify bearer request message to send the radio side network element identifier and the downlink tunneling identifier to the S-GW 54.

Steps 1108~1109: if the radio access technology changes or the core network demands to report the user location information for charging, then the S-GW 54 uses the bearer update process to report the above information to the P-GW 55.

Step 1110: the S-GW 54 receives the modify bearer request message, and then returns a modify bearer response message to the MME 53.

Figure 12:
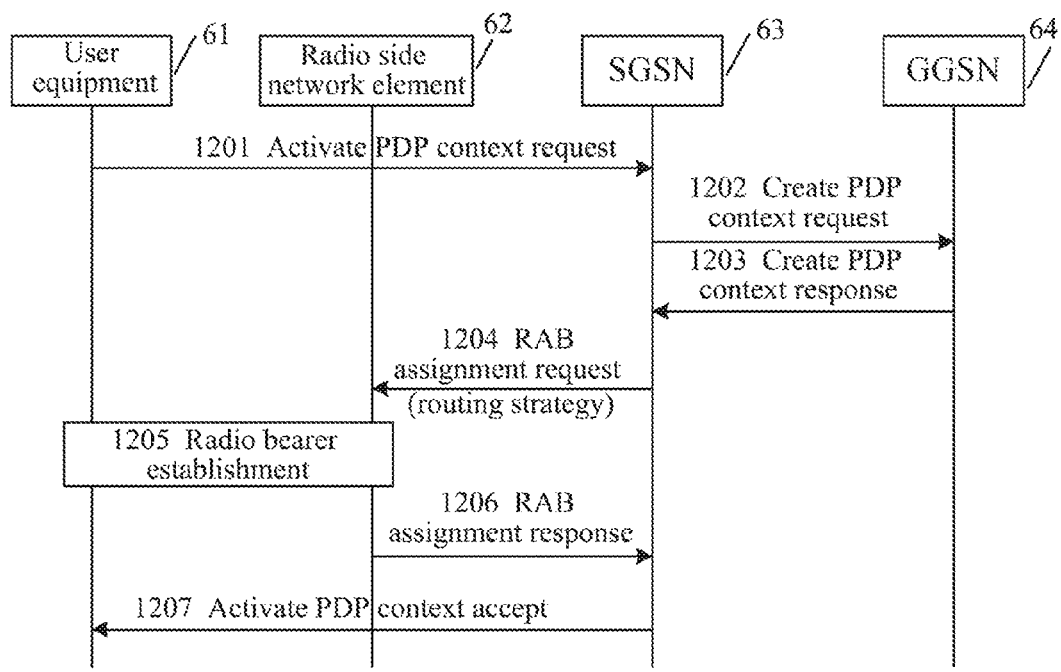
FIG. 12 is a schematic diagram of a procedure of acquiring routing strategies when a user initiates a context activation process according to the present document.

FIG. 12 is a schematic diagram of the procedure of acquiring the routing strategies when a user initiates a context activation procedure according to the present document, and as shown in FIG. 12, the process specifically comprises the following steps.

Step 1201: if the user needs to access a certain PDN or request a certain service, the user equipment 61 initiates a packet data protocol (PDP) context activation procedure and sends the activate PDP context request message to the SGSN 63 to establish a connection between the user equipment 61 and the PDN.

Step 1202: the SGSN 63 receives the activate PDP context request message, and then uses the access point names reported by the user to query to acquire the GGSN 64 to be accessed by the user via the DNS, and establishes the bearer connection between the SGSN 63 and the GGSN 64 with the create PDP context process. The SGSN 63 sends the information of the SGSN address, the bearer-related QoS parameter, and the bearer connection downlink tunneling identifier, and so on to the GGSN 64 by creating the PDP context request message.

Step 1203: the GGSN 64 receives the create PDP context request message, and then generates the user context, and sends information of the IP address assigned to the user equipment 61, the uplink tunneling identifier, the negotiated QoS parameter, and so on to the SGSN 63 with the create PDP context response message.

The above description is the related process when the SGSN 63 is a SGSN supporting the Gn/Gp interface, and if the SGSN 63 is a SGSN supporting the S4 interface, the SGSN 63 establishes a connection between the user equipment 61 and the PDN through a session establishment process.

Step 1204: the SGSN 63 receives the create PDP context response message, and then uses the RAB assignment request message to indicate the radio side to establish the bearer, and uses the RAB assignment request message to send the bearer-related QoS parameter and the routing strategies to the radio side network elements.

The specific form of the routing strategies might be the corresponding relationship between the packet destination address and two routing options of the local IP access and the core network access; it might also be the relationship between the local IP access type and the routing option, wherein the local IP access type is the local IP access to Internet, or the local IP access to home network, and so on.

The routing strategies might be for the users or for the radio side network elements. If the routing strategies are for the users, the SGSN 63 can send the routing strategies obtained from the HSS to the radio side network element 62 via the user registration or location update process; if the routing strategies are for the radio side network elements, the SGSN 63 might locally configure the general routing strategies of the local IP access to send to the radio side network element 62.

Step 1205: the radio side network element 62 receives the RAB assignment request message, and then establishes the corresponding radio bearer according to the bearer information indicated by the core network.

Step 1206: the radio side network element 62 returns the RAB assignment response message to the SGSN 63 after completing to establish the radio bearer to notify the core network that the radio bearer establishment is completed.

Step 1207: the SGSN 63 receives the RAB assignment response message, and then returns a create PDP context response message to the user equipment 61 to notify the user equipment 61 that the connection between the user equipment 61 and the PDN is established.

Figure 13:
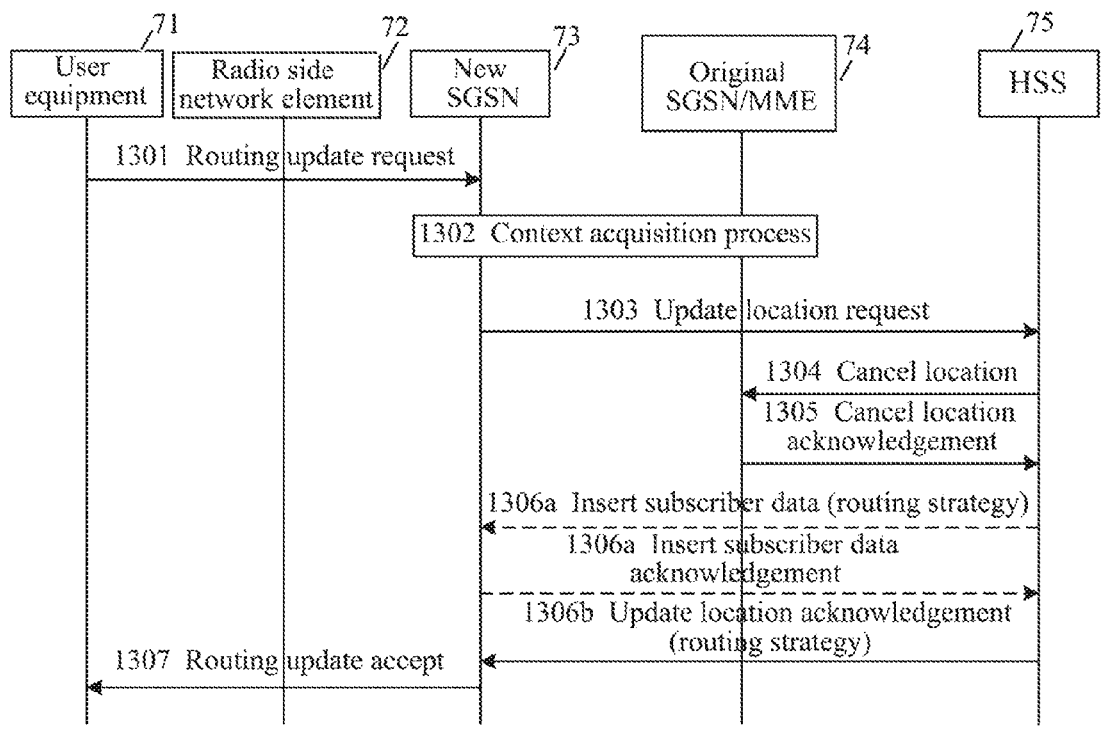
FIG. 13 is a schematic diagram of a procedure of acquiring routing strategies when a user initiates a routing area update process according to the present document.

FIG. 13 is a schematic diagram of the procedure of acquiring the routing strategies when a user initiates a routing area update according to the present document, and as shown in FIG. 13, the process specifically comprises the following steps.

Step 1301: if the user moves to a new routing area outside the stored routing areas, the user equipment 71 initiates a routing update process, and the user equipment 71 uses the routing update request message to send information of the user temporary ID, the original routing area ID, and the user capability, and so on to the radio side network element 72, wherein the routing update request message is a non-access stratum message. The radio side network element 72 selects a new SGSN 73 to be accessed for the user after receiving the non-access layer message, and sends a routing update request message to the new SGSN 73.

Step 1302: the new SGSN 73 receives the routing update request message, and then finds out the original SGSN/MME 74 based on the user temporary identifier and the original routing area identifier to obtain the user context information.

Step 1303: the new SGSN 73 determines that the new SGSN 73 itself does not store the user subscription data, sends an update location request message including the information of the new SGSN identifier, the user identifier, and the update type and so on to the HSS 75.

Steps 1304~1305: when the idle mode signaling reduction (ISR) function is not activated, the HSS 75 acquires that the user is registered in the new SGSN 73, and sends a cancel location message to the original SGSN/MME 74 so that the original SGSN/MME 74 deletes the user context information stored in it and releases the signaling connection in the original radio side network element 72. The original SGSN/MME 74 returns a cancel location acknowledgement message to the HSS 75.

After the HSS 75 receives the update location request message, if the new SGSN 73 is a SGSN supporting the Gn/Gp interface, then step 1306a is performed; if the new SGSN 73 is a SGSN supporting the S4 interface, then step 1306b is performed.

Step 1306a: the HSS 75 and the new SGSN 73 supporting the Gn/Gp interface use the MAP protocol to interact, the HSS 75 uses the insert subscriber data process to send the routing strategies and the user subscription data to the new SGSN 73, and the new SGSN 73 stores the received user subscription data and the routing strategies. The new SGSN 73 returns an insert subscriber data acknowledgement message to the HSS 75.

The routing strategies are for the user and might be the corresponding relationship between the packet destination address and two routing options of the local IP access and the core network access; it might also be the relationship between the local IP access type and the routing option, wherein the local IP access type is the local IP access to Internet, or the local IP access to home network, and so on.

Step 1306b: the HSS 75 and the new SGSN 73 supporting the S4 interface use the Diameter protocol to interact, the HSS 75 uses the location update acknowledgement message to send the user subscription data and the routing strategies to the new SGSN 73, and the new SGSN 73 stores the received user subscription data and the routing strategies.

The routing strategies are for the users, and it might be the corresponding relationship between the packet destination address and two routing options of the local IP access and the core network access; it might also be the relationship between the local IP access type and the routing option, wherein the local IP access type is the local IP access to Internet, or the local IP access to home network, and so on.

The routing strategies stored in HSS 75 are for each user, and can be set and stored in the HSS 75 by the operator.

Step 1307: the new SGSN 73 sends the routing update accept message including the information of temporary identifier assigned to the user and so on to the user equipment 71 after completing the routing area update of the user.

After the new SGSN 73 acquires the user's routing strategies, if it needs the routing strategies for the user when the user's local IP access function is enabled, the new SGSN 73 sends the corresponding routing strategies to the radio side network element 72, and the radio side network element 72 transmits the subscriber data based on the routing strategies for the user.

In addition, if the original SGSN/MME 74 has acquired the routing strategies for the user, the original SGSN/MME 74 might also provide the routing strategies for the user to the new SGSN 73.

Figure 14:
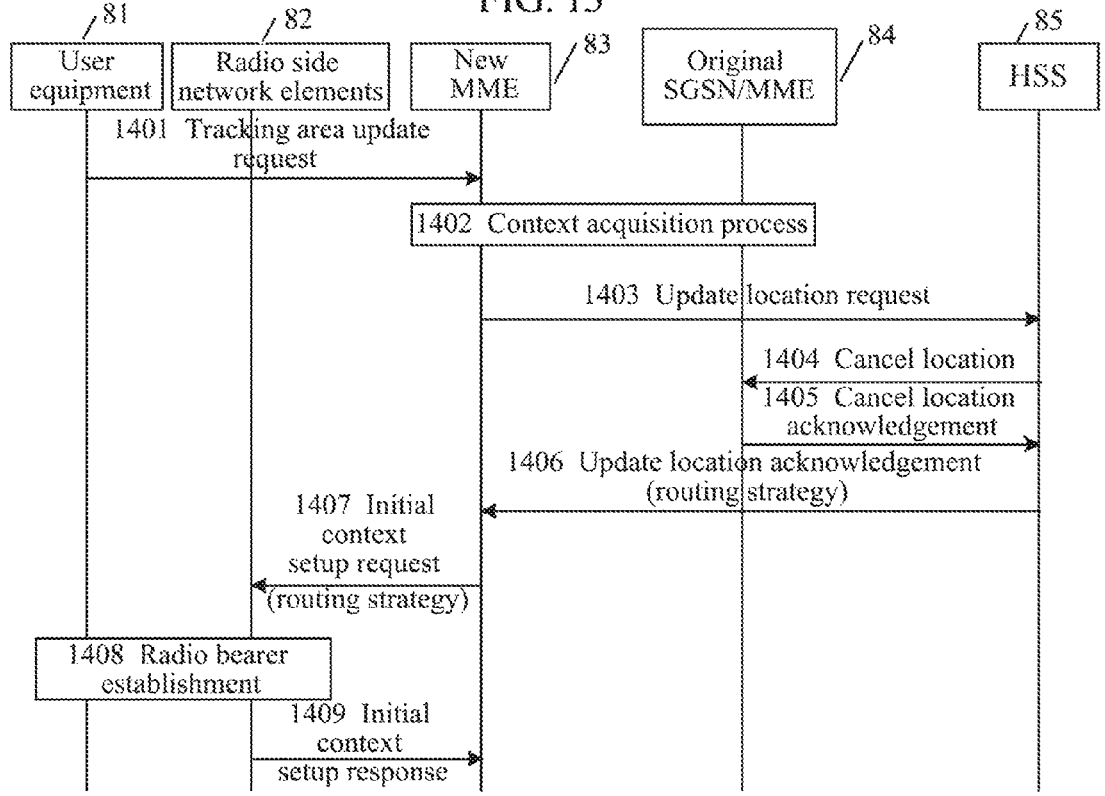
FIG. 14 is a schematic diagram of a procedure of acquiring routing strategies when a user initiates a tracking area update process according to the present document.

FIG. 14 is a schematic diagram of the procedure of acquiring the routing strategies when a user initiates a tracking area update process according to the present document, and as shown in FIG. 14, the process specifically comprises the following steps.

Step 1401: if the user moves to a tracking area outside of the tracking area list, the user equipment 81 initiates a tracking area update process, and the user equipment 81 uses the tracking area update request message to send information of the user temporary identifier, the original tracking area identifier, the user capability and so on to the radio side network elements, and the tracking area update request message is a non-access stratum message. Besides, the user needs to send uplink data, and then sets an activation indication in the tracking area update request message to request the core network to establish a radio bearer in the tracking area update process. The radio side network element 82 receives the non-access stratum message, then selects a new MME 83 to be accessed for the user, and sends a routing update request message to the new MME 83.

Step 1402: the new MME 83 receives the tracking area update request message, and then finds out the original SGSN/MME 84 according to the user temporary identifier and the original tracking area identifier to acquire the user context information.

Step 1403: the new MME 83 determines that the MME 83 itself does not store the user subscription data, and sends an update location request message including information of the new MME identifier, the user identifier, the update type, and so on to the HSS 85.

Steps 1404~1405: when the ISR function is not activated, the HSS 85 knows that the user is registered in the new MME 83, and sends a cancel location message to the original SGSN/MME 84 so that the original SGSN/MME 84 deletes the user context information stored in it, and releases the signaling connection in the original radio side network element 82. The original SGSN/MME 84 returns a cancel location acknowledgement message to the HSS 85.

Step 1406: the HSS 85 sends the user subscription data and the routing strategies to the new MME 83 via the location update acknowledgement message, and the new MME 83 stores the received user subscription data and the routing strategies.

The specific form of the routing strategies might be the corresponding relationship between the packet destination address and two routing options of the local IP access and the core network access; it might also be the relationship between the local IP access type and the routing option, wherein the local IP access type is local IP access to Internet, or local IP access to home network, and so on.

The routing strategies might be for users or for the radio side network elements. If the routing strategies are for the users, the new MME 83 can send the routing strategies obtained from the HSS 85 to the radio side network elements; if the routing strategies are for the radio side network elements, the new MME 83 can locally configure the general routing strategies of the local IP access to send to the radio side network elements.

Step 1407: since the tracking area update request message sent by the user contains the activation indication, the new MME 83 uses the initial context setup request message to send the bearer-related QoS parameter and the routing strategies to the radio side network elements, and the attach accept message might be also encapsulated into the initial context setup request message which is sent to the radio side network elements.

The specific form of the routing strategies might be the corresponding relationship between the packet destination address and two routing options of the local IP access or the core network access; it might also be the relationship between the local IP access type and the routing option, wherein the local IP access type is the local IP access to Internet, or the local IP access to home network, and so on.

The routing strategies might be for the users or for the radio side network elements. If the routing strategies are for the users, the MME can send the routing strategies obtained from the HSS 85 in step 904 to the radio side network elements; if the routing strategies are for the radio side network elements, the MME can locally configure and send the general routing strategies of the local IP access to the radio side network elements.

Step 1408: the radio side network elements 82 receive the initial context setup request message, and then establish the corresponding radio bearer according to the bearer information indicated by the core network, and stores the routing strategies.

Step 1409: the radio side network elements 82 return the initial context setup response message to the new MME 83 after completing to establish the radio bearer to notify the core network that the radio bearer establishment is completed.

Figure 15:
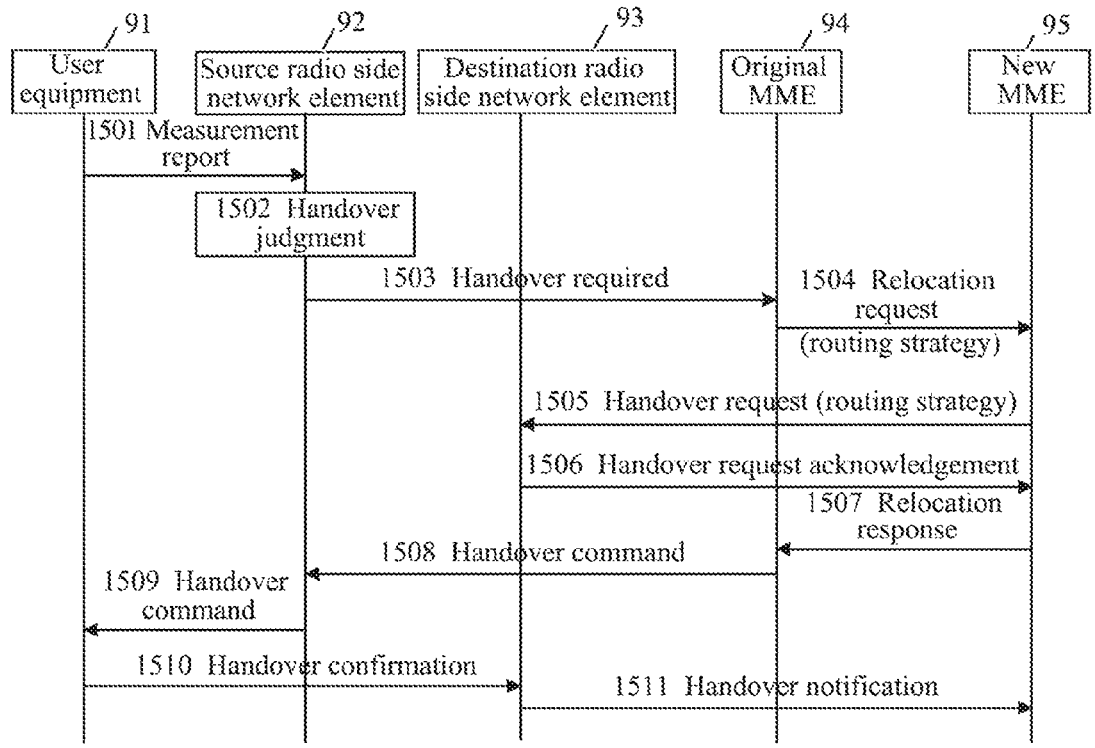
FIG. 15 is the schematic diagram 1 of a procedure of the destination radio side network element acquiring routing strategies in a handover process according to the present document.

FIG. 15 is a schematic diagram 1 of the destination radio side network element acquiring the routing strategies in the handover process according to the present document, and as shown in FIG. 15, the process specifically comprises the following steps.

Step 1501: the user equipment 91 measures the radio signal condition in adjacent cells to report to the radio side network element that is serving the user equipment 91 currently in the form of measurement report.

Step 1502: The radio side network element, namely the source network element 92, that is currently serving the user equipment 91 finds out that the signal in the cell in which the user equipment 91 is currently located becomes poor according to the measurement report reported by the user equipment 91, and it needs to perform handover to another radio side network element, the source radio side network element 92 selects another radio side network element to initiate handover.

Step 1503: if the source radio side network element 92 determines that it needs to initiate the handover implemented by the core network according to the condition of the interface between the network elements or the location information of the destination radio side network element 93, the source radio side network element 92 sends a handover required message including information of the indication of whether to support the tunnel direct forwarding and the destination radio network side identifier and so on to the original MME 94.

Step 1504: the original MME 94 receives the handover request message, and then judges whether it needs to reselect a MME according to the destination radio side network element 93 identifier, and if determines that the MME reselection should be performed, the original MME 94 sends the user's context information, the destination radio side network element identifier, the indication of whether it supports direct forwarding of the tunnel, and the routing strategies and so on to the new MME 95 via the relocation request message.

The specific form of the routing strategies might be the corresponding relationship between the packet destination address and two routing options of the local IP access and the core network access; it might also be the relationship between the local IP access type and the routing option, wherein the local IP access type is the local IP access to Internet, or the local IP access to home network, and so on.

The routing strategies might be for the users or for the radio side network elements. If the routing strategies are for the users, the original MME 94 might send the routing strategies obtained from the HSS to the new MME 95 via the user registration or location update process; if the routing strategies are for the radio side network elements, the original MME 94 might send the locally configured general routing strategies of the local IP access to the new MME 95.

Step 1505: the new MME 95 receives the relocation request message, and then sends a handover request message including information of the bearer establishment list, handover restriction list, a source to destination transport container, routing strategies, and so on to the destination radio side network element 93 to indicate the destination radio side network element 93 to reserve the handover resource.

Step 1506: the destination radio side network element 93 receives the handover request message, and then establishes the radio bearer and stores the routing strategies, and after completing to establish the radio bearer, the destination radio side network element 93 returns a handover request acknowledgement message to the new MME 95.

Step 1507: the new MME 95 receives the handover request acknowledgement message, and then uses the relocation response message to notify the original MME 94 that the destination side is ready for the handover.

Steps 1508~1509: the original MME 94 uses a handover command to indicate the user equipment 91 to perform handover to the destination radio side network element 93.

Steps 1510~1511: the user equipment 91 synchronizes to the destination radio side network element 93, and then sends a handover confirmation message to the destination radio side network element 93. The destination radio side network element 93 uses the handover notification message to notify the new MME 95 that the handover process is completed, and the handover notification message contains the destination radio side network element identifier and the downlink tunnel identifier.

If the source and destination radio side network elements 92, 93 provide a service by the same MME, the handover process is completed by the same MME, and the step 1504 and the step 1507 are not performed; and the routing strategies are sent by the same MME.

Figure 16:
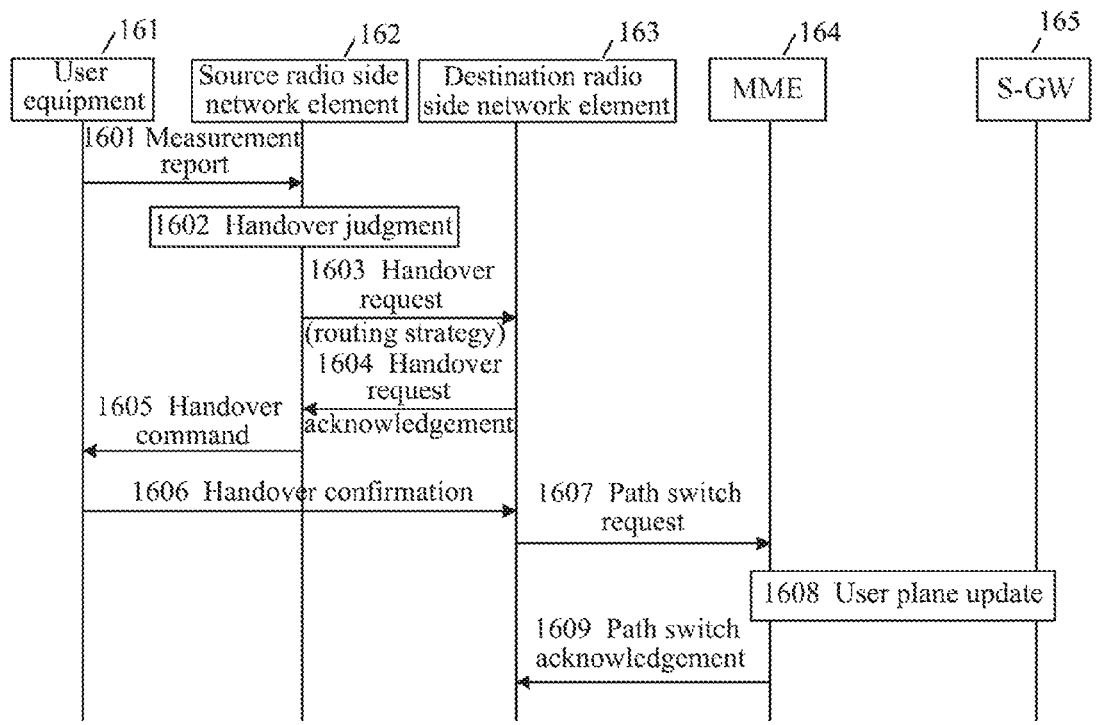
FIG. 16 is the schematic diagram 2 of a procedure of the destination radio side network element acquiring routing strategies in a handover process according to the present document.

FIG. 16 is a schematic diagram of the destination radio side network element acquiring the routing strategies in the handover process according to the present document, and as shown in FIG. 16, the process specifically comprises the following steps.

Step 1601: the user equipment 161 measures the radio signal condition in adjacent cells to report to the radio side network element 162 which is serving the user equipment 161 currently in the form of measurement report.

Step 1602: The radio side network element, namely the source network element 162, that is currently serving the user equipment 161 finds out that the signal in the cell in which the user equipment 161 is currently located becomes poor according to the measurement report reported by the user equipment 161, and it needs to perform handover to another radio side network element, the source radio side network element 162 selects another radio side network element to initiate a handover.

Step 1603: if the source radio side network element 162 determines that it needs to initiate the handover implemented by the core network according to the condition of the interface between the network elements or the location information of the destination radio side network element 163, the source radio side network elements 162 sends a handover request message including information of the RRC context, the destination radio side network element identifier, the AS layer configuration, the bearer-related QoS parameter, the routing strategies, and so on to the original MME 164.

The specific form of the routing strategies might be the corresponding relationship between the packet destination address and two routing options of the local IP access and the core network access; it might also be the relationship between the local IP access type and the routing option, the local IP access type is the local IP access to Internet, or the local IP access to home network, and so on. The routing strategies might be for the users or for the network elements.

Step 1604: the original source radio side network element 162 receives the handover request message, and then stores the routing strategies and allocates the radio resource according to the information included in the handover request message and triggers the user equipment 161 to initiate the handover to the destination radio side network element 163 after completing the handover preparation, and sends a handover request acknowledgement message to the source radio side network element 162.

Step 1605: the source radio side network element 162 receives the handover request acknowledgement message, and then indicates the user equipment 161 to perform handover to the destination radio side network element 163 with a handover command.

Step 1606: the user equipment 161 sends a handover confirmation message to the destination radio side network element 163 after synchronizing to the destination radio side network element 163 to indicate that the handover process is completed. At this point, the destination radio side network element 163 can start to send the cached downlink data to the user equipment 161.

Step 1607: the destination radio side network element 163 notifies the MME 164 that the user equipment 161 has changed the serving cell with a path switch request message.

Step 1608: a user plane update process is implemented between the MME 164 and the S-GW 165, and the destination radio side network element ID and the downlink tunnel ID are sent to the S-GW 165, and at this point, sending the downlink data in the core network can also be started.

Step 1609: the MME 164 returns a path switch request acknowledgement message to the destination radio side network element 163 to provide the aggregate maximum bit rate (AMBR) of the updated user equipment 161 or indicate which radio bearers fail to be established so that the radio side deletes the corresponding radio bearers.

Figure 17:
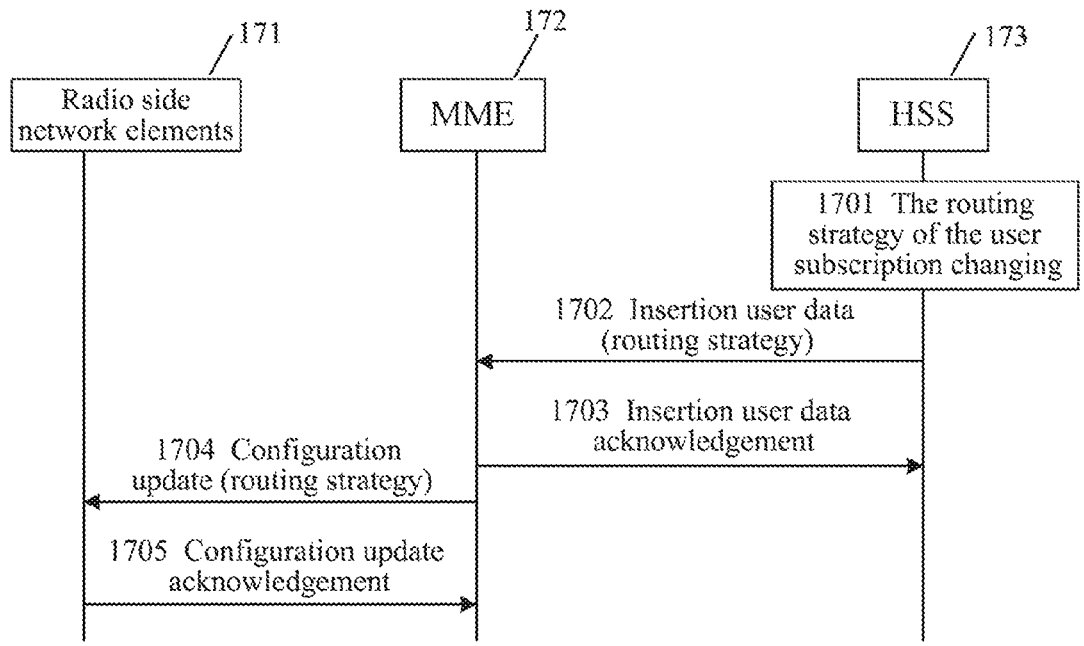
FIG. 17 is the schematic diagram 1 of a procedure of acquiring the routing strategies when updating the routing strategies according to the present document.

FIG. 17 is a schematic diagram 1 of acquiring the routing strategies when updating the routing strategies according to the present document, and as shown in FIG. 17, the process specifically comprises the following steps.

Step 1701: the user and the operator negotiate to modify the subscribed routing strategies of local IP access and the routing strategies are the routing strategies for the users.

The specific form of the routing strategies might be the corresponding relationship between the packet destination address and the two routing options of the local IP access and the core network access; might also be the relationship between the local IP access type and the routing options, wherein the local IP access type might be the local IP access to Internet, or the local IP access to home network, and so on.

Step 1702: the HSS 173 sends the updated routing strategies to the MME 172 via the insert subscriber data process.

Step 1703: the MME 172 receives the updated routing strategies and then returns an insert subscriber data acknowledgement message to the HSS 173.

Step 1704: if the user equipment is already in the connection state and has established a user plane, the MME 172 sends the updated routing strategies to the radio side network element 171 via the configuration update message.

Step 1705: the radio side network element 171 receives the updated routing strategies, and then updates its own stored routing strategies for the user, and returns the configuration update acknowledgement message to the MME 172.

In addition, if the routing strategies for the radio side network elements locally configured by the MME 172 change, the updated routing strategies are directly sent to the radio side network elements 171 with the process similar to steps 1704~1705.

Figure 18:
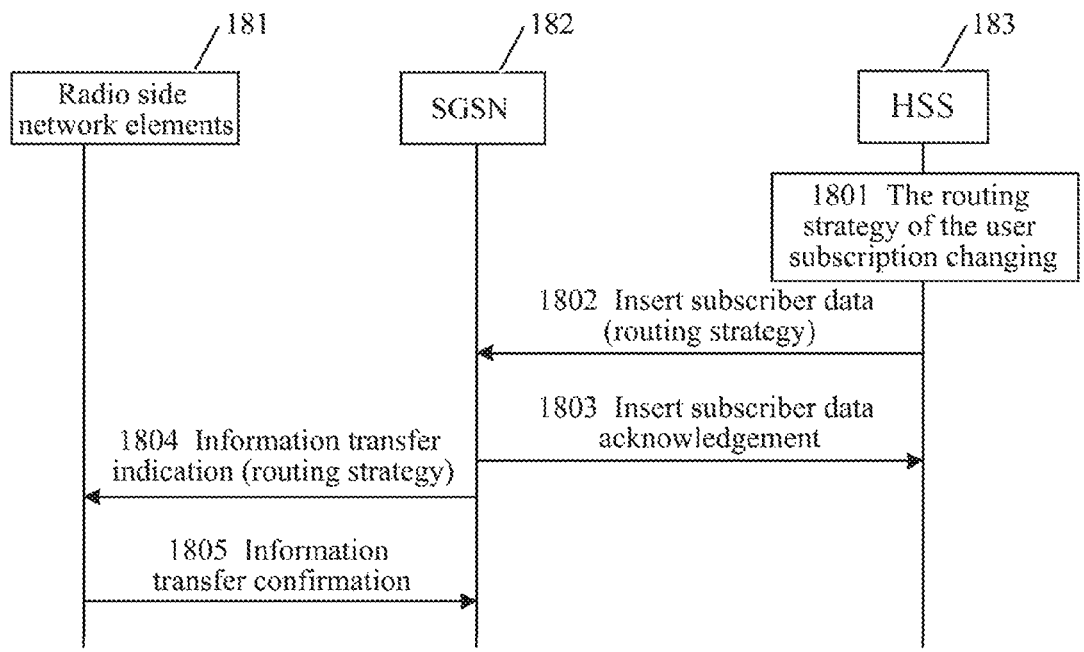
FIG. 18 is the schematic diagram 2 of a procedure of acquiring the routing strategies when updating the routing strategies according to the present document.

FIG. 18 is a schematic diagram 2 of the procedure of acquiring the routing strategies when the routing strategies update according to the present document, and as shown in FIG. 18, the process specifically comprises the following steps:

Step 1801: the user and the operator negotiate to modify the routing strategies of local IP access of the subscription, and the routing strategies are the routing strategies for the users.

The specific form of the routing strategies might be the corresponding relationship between the packet destination address and the two routing options of the local IP access and the core network access; might also be the relationship between the local IP access type and the routing options, wherein the local IP access type might be the local IP access to Internet, or the local IP access to home network, and so on.

Step 1802: the HSS 183 sends the updated routing strategies to the SGSN 182 via the insert subscriber data process.

Step 1803: the SGSN 182 receives the updated routing strategies, and then returns an insert subscriber data acknowledgement message to the HSS 183.

Step 1804: if the user equipment is already in the connection state and has established a user plane, the SGSN 182 sends the updated routing strategies to the radio side network element via an information transfer indication message.

Step 1805: the radio side network element receives the updated routing strategies, and then updates its own stored routing strategies for the users, and returns the configuration update acknowledgement message to the SGSN 182.

In addition, if the routing strategies for the radio side network element locally configured by the SGSN 182 change, the updated routing strategies are directly sent to the radio side network element with the process similar to steps 1804~1805.

If the radio side network element acquires both the routing strategies for the users and the routing strategies for the network elements, and when the radio side network elements transmit data to the user, it might select the routing strategies according to the configuration rules, for example, select the routing strategies with the high priority according to the priorities; and for another example, preferably select the routing strategies for the user for a particular type of users.

After the radio side network element acquires the routing strategies, it transmits the data according to the routing strategies. Specifically, the radio side network elements do not distinguish users, and uniformly send the data of each user according to the routing strategies for the corresponding radio side network elements; alternatively, transmit the corresponding subscriber data according to the routing strategies for each user.

The above description is the preferred embodiments of the present document, and it is not intended to limit the protection scope of the claims of the present document.

What is claimed is:

1. A method for acquiring a routing strategy comprising:
   when the routing strategy is for a radio side network element, locally configuring a general routing strategy by a mobility management element for the radio side network element, and when a user's local IP access function is enabled, sending the general routing strategy for the radio side network element to the radio side network element;
   when the routing strategy is for a user, receiving and storing the routing strategy by the mobility management element for the user sent from a home subscriber server (HSS) at the time of the user registering to a network or initiating a location update, and when the user's local IP access function is enabled, sending the routing strategy for the user to the radio side network element;
   wherein,
   (i) the radio side network element is a data offload function unit, a home NodeB, a home evolved NodeB (H(e)NB), a macro base station, or a H(e)NB gateway which is equipped with the data offload function unit;
   (ii) the mobility management element is a serving General Packet Radio Service support node (SGSN) or a mobility management entity (MME); and
   (iii) the routing strategy is a corresponding relationship between a packet destination address and two routing options of a local IP access or a core network access, or a relationship between a routing option and a local IP access type, wherein the local IP access type is local IP access to the Internet or local IP access to a home network.

2. The method of claim 1, further comprising:
   when the general routing strategy for the radio side network element locally configured by the mobility management element changes, sending a changed routing strategy by the mobility management element to the radio side network element;
   when the routing strategy for the user stored in the HSS changes, sending the changed routing strategy by the HSS for the user to the mobility management element;
   (i) if a user equipment held by the user is in an idle state, storing the changed routing strategy by the mobility management element, and
   (ii) if the user equipment is in a connection state and there is a radio bearer, sending the changed routing strategy to the radio side network element by the mobility management element via an S1 or Iu interface message.

3. The method of claim 1, when the mobility management element is the MME, the method further comprising:
   when a user equipment held by the user is handed over from a source radio side network element to a destination radio side network element, sending the routing strategy by an original MME to a new MME via a relocation request message, and sending a received routing strategy by the new MME to the destination radio side network element.

4. The method of claim 1, further comprising:
   when a user equipment held by the user is handed over from a source radio side network element to a destination radio side network element, sending a handover request message carrying the routing strategy by the source radio side network element to the destination radio side network element.

5. The method of claim 1, wherein, when the mobility management element is the SGSN, the step of sending the routing strategy for the user by the HSS to the mobility management element comprises:
   determining that the SGSN does not store user subscription data, and sending an update location request message including information of a SGSN identifier, a user identifier, and an update type by the SGSN to the HSS;
   after the HSS receives the update location request message, if judging that the SGSN supports a Gn/Gp interface, sending the user subscription data and the routing strategy for the user by the HSS to the SGSN using an insert subscriber data process; and if judging that the SGSN supports an S4 interface, sending the user subscription data and the routing strategy for the user by the HSS to the SGSN using an update location acknowledgement message.

6. The method of claim 1, wherein, when the mobility management element is the MME, the step of sending the routing strategy for the user by the HSS to the mobility management element comprises:
   determining that the MME does not store user subscription data, and sending an update location request message including information of an MME identifier, a user identifier, and an update type by the MME to the HSS;
   receiving by the HSS the update location request message, and then using an update location acknowledgement message to send the user subscription data and the routing strategy for the user by the HSS to the MME.

7. A system for acquiring a routing strategy, comprising: a mobility management element and a radio side network element; wherein:
   the mobility management element comprises a processor configured to:
   (i) when the routing strategy is for the radio side network element, locally configure a general routing strategy for the radio side network element, and when a user's local IP access function is enabled, send the general routing strategy for the radio side network element to the radio side network element; and,
   (ii) when the routing strategy is for a user, receive and store the routing strategy for the user sent from a home subscriber server (HSS) at the time of the user registering to a network or initiating a location update, and when a user's local IP access function is enabled, send the routing strategy for the user to the radio side network element; and
   the radio side network element is configured to receive the routing strategy from the mobility management element;
   wherein,
   (i) the radio side network element is a data offload function unit, a home NodeB, a home evolved NodeB (H(e)NB), a macro base station, or a H(e)NB gateway which is equipped with the data offload function unit;
   (ii) the mobility management element is a serving General Packet Radio Service support node (SGSN) or a mobility management entity (MME); and
   (iii) the routing strategy is a corresponding relationship between a packet destination address and two routing options of a local IP access or a core network access, or a relationship between a routing option and a local IP access type, wherein the local IP access type is local IP access to Internet or local IP access to home network.

8. The system of claim 7, wherein, the processor of the mobility management element is further configured to:
when the general routing strategy for the radio side network element locally configured by the mobility management element changes, send a changed routing strategy to the radio side network element;
when the routing strategy for the user stored in the HSS changes, receive the changed routing strategy for the user sent from the HSS;
  (I) if a user equipment held by the user is in an idle state, store the changed routing strategy, and
  (II) if the user equipment is in a connection state and there is a radio bearer, send the changed routing strategy to the radio side network element via an S1 or Iu interface message.

9. The system of claim 7, wherein, when the mobility management element is the MME, the processor of the MME is configured that: when a user equipment held by the user is handed over from a source radio side network element to a destination radio side network element, an original MME sends the routing strategy to a new MME via a relocation request message, and the new MME sends a received routing strategy to the destination radio side network element.

10. The system of claim 7, wherein, the radio side network element is configured that: when a user equipment held by the user is handed over from a source radio side network element to a destination radio side network element, the source radio side network element sends a handover request message carrying the routing strategy to the destination radio side network element.

11. A system for acquiring a routing strategy, comprising: a radio side network element management system and a radio side network element; wherein:
the radio side network element management system comprises a processor configured to configure the routing strategy for the radio side network element, and, when the radio side network element powers on, send the routing strategy for the radio side network element to the radio side network element; and
the radio side network element is configured to receive the routing strategy from the radio side network element management system;
wherein,
(i) the radio side network element is a data offload function, a home NodeB, a home evolved NodeB (H(e)NB), a macro base station, or a H(e)NB gateway which is equipped with the data offload function unit;
(ii) the radio side network element management system is a home NodeB management system, home evolved NodeB management system (H(e)MS), or a traditional NodeB management system; and
(iii) the routing strategy is a corresponding relationship between a packet destination address and two routing options of a local IP access or a core network access, or a relationship between a routing option and a local IP access type, wherein the local IP access type is local IP access to Internet or local IP access to home network.

12. The system of claim 11, wherein, the processor of the radio side network element management system is further configured to, when the routing strategy for the radio side network element changes, send a changed routing strategy for the radio side network element to the radio side network element.

13. The system of claim 11, wherein:
the processor of the radio side network element management system is configured to send the routing strategy for the radio side network element to the radio side network element in the following way: send a TR-069 parameter value setting request message carrying radio side network element parameter information which includes a radio configuration parameter, a S-GW address, and the routing strategy to the radio side network element; and
the radio side network element is configured to receive the routing strategy from the radio side network element management system in the following way: receiving the TR-069 parameter value setting request message to obtain the routing strategy, and then return a TR-069 parameter value setting response message to the radio side network element management system.

* * * * *